Aug. 2, 1932.  L. LEVITT  1,869,699
ILLUMINATED SIGN
Filed May 9, 1930
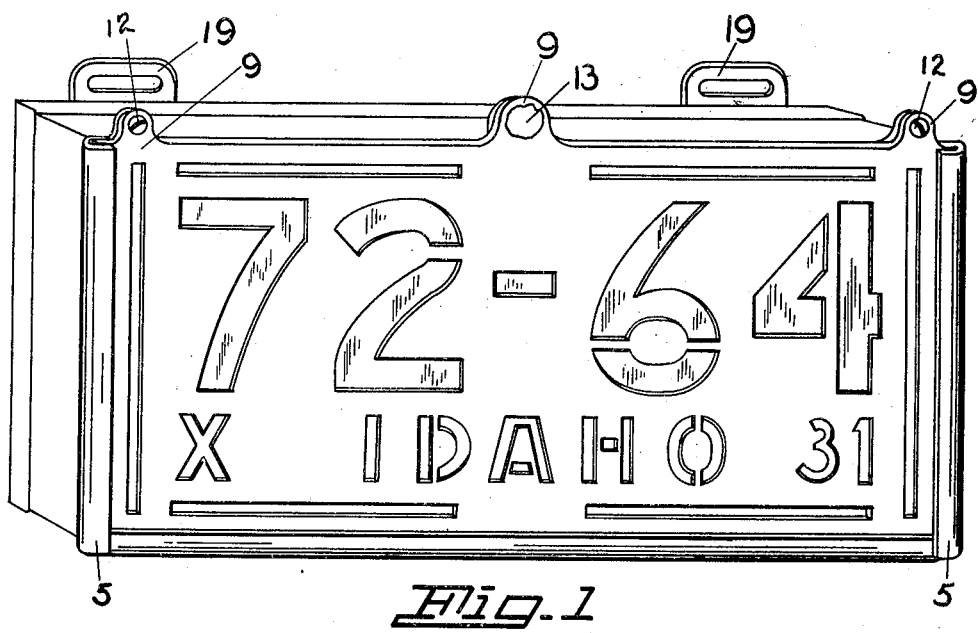
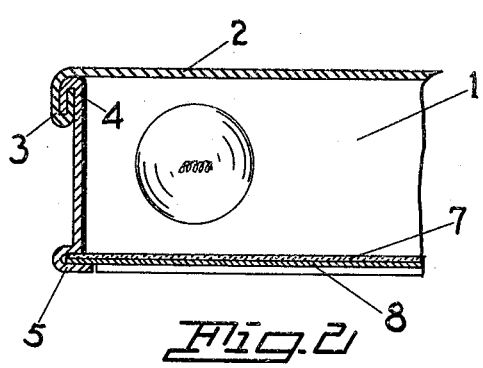
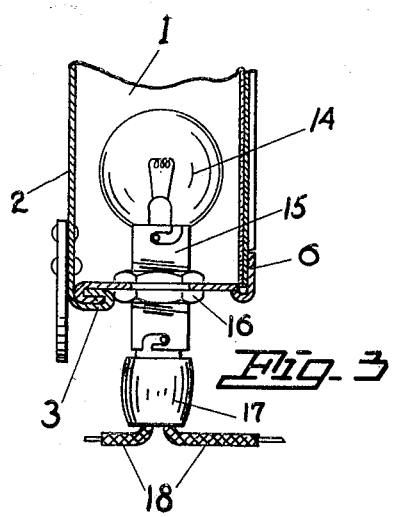
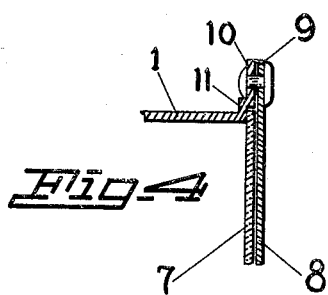
LENOARD LEVITT
Inventor
By Herbert E. Smith
Attorney Patented Aug. 2, 1932

1,869,699

UNITED STATES PATENT OFFICE

LENOARD LEVITT, OF MISSOULA, MONTANA, ASSIGNOR, BY DIRECT AND MESNE ASSIGNMENTS, OF FORTY ONE-HUNDREDTHS TO MARIE K. YACORZYNSKI, OF SPOKANE, WASHINGTON, AND THIRTY ONE-HUNDREDTHS TO FREDERICK JOSEPH ROBERTS, OF SAN DIEGO, CALIFORNIA

ILLUMINATED SIGN

Application filed May 9, 1930. Serial No. 450,988.

My present invention relates to improvements in illuminated signs of the type utilizing a lamp box having a stenciled face, and adapted especially for use as a license tag and holder on automotive vehicles.

The primary object of the invention is the provision of a sign of this character which is simple in construction and composed of a minimum number of parts thus insuring manufacture at a comparatively low cost of production.

The parts of the sign are so related and arranged as to assure convenience and facility in assembling and fastening the assembled parts, and the completed article is a durable one and not likely to become broken or deranged.

The invention consists in certain novel combinations and arrangements of parts as will hereinafter be more fully set forth and claimed. In the accompanying drawing I have illustrated one complete example of the physical embodiment of my invention wherein the parts are combined and arranged according to the best mode I have thus far devised for the practical application of the principles of my invention.

Figure 1 is a perspective view of the sign embodied in a license tag for an automotive vehicle.

Figure 2 is a horizontal, longitudinal, detail sectional, view at one end of the lamp box.

Figure 3 is a vertical sectional view at the bottom of the lamp box showing one of the lamps.

Figure 4 is a vertical sectional detail view at the top front edge of the box, showing the mode of fastening the parts together.

The box 1 is of rectangular shape and of suitable size and constructed of acceptable material, with an open front, and a back plate or rear closure 2. The edges of the back plate are secured to the box to form a weather tight joint by means of bent flanges 3 of the plate that are crimped or folded into complementary flanges 4 at the rear edges of the box, by the employment of suitable machines or tools.

At the front of the box, its two end edges and the bottom edge are fashioned with flanges with return bends, as indicated respectively at 5, 5, and 6, and the return bend flanges form grooves with their openings at their inner sides.

The grooves are adapted to receive a glass panel 7 of suitable color, and a stencil plate 8 of appropriate material, the plate being provided with the identifying data of the license and formed by stenciling or cutting out the figures and letters from the material of the plate. The colored glass panel is located at the inner side and the stencil plate or license tag is situated at the outer side of the box front, or in front of the glass panel, in order that the sign may be illuminated from the interior of the lamp box.

The plates are supplied in standard sizes and the boxes and glass panels are of course manufactured in complementary sizes for the license plates or stenciled signs.

At the upper edge of the stencil plate are provided two end perforated lugs 9 and at the center of the upper edge a third perforated lug is fashioned, all of the lugs projecting above the top edge of the plate as shown in Figure 1.

The front upper edge of the lamp box is also provided with complementary, perforated lugs 10 that are offset from the box and arranged to aline with or register with the perforated lugs of the stencil plate.

As best seen in Figure 4 the upper edge of the box is fashioned with an upset shoulder 11 that extends the full length of the box, and the lugs 10 are offset from this shoulder. The shoulder forms a recess for the upper edge of the glass panel and the panel is seated in the recess in such manner as to prevent rattling and also to prevent displacement, the other three edges of the glass panel being retained by the flanges of the lamp box.

Screws or bolts 12 are passed through the perforated lugs at the ends of the box, and a seal 13 is preferably used at the center of the box. This seal may be formed as a permanent rivet to prevent unauthorized removal of the license plate during the life of the license, and of course the seal is broken when a new license plate is to be used for a succeeding year. By the use of the screws and the seal the panel of glass and the license plate are securely attached to the lamp box to make a weather proof joint and to prevent rattling of parts.

One or more lamps 14 are used in the box for illuminating the license plate, and the lamp 14 as seen in Figure 3 is fixed in its socket 15, the latter being secured in the bottom of the box by means of nuts 16. An attaching or connecting plug 17 is provided for attachment to the socket 15 exterior of the box, and the electric wires 18 extend from this plug to a suitable source of electrical energy.

The lamp box may be used at either the front or rear of an automotive vehicle, or a box may be used at the front and at the rear, and attached to a suitable support with bolts passing through slotted attaching lugs 19 at the rear of the box.

Having thus fully described my invention, what I claim as new and desire to secure by Letters Patent is:—

The combination in an illuminated sign, of a lamp box and lamp therein, said box having two end flanges and a bottom flange forming exterior retaining grooves, an exterior upset shoulder across the top edge of the box forming a seat, a transparent panel and an exterior stencil plate having edges in said grooves and the upper edge of the panel located in said seat, offset perforated lugs integral with said shoulder, complementary perforated lugs on the upper edge of the plate, clamp screws fastening two pairs of complementary lugs, and a permanent rivet fastening an intermediate pair of lugs.

In testimony whereof I affix my signature.

LENOARD LEVITT.